(12) United States Patent
Parekh et al.

(10) Patent No.: US 10,326,245 B1
(45) Date of Patent: Jun. 18, 2019

(54) LIGHT ILLUMINATING DATA COMMUNICATION CABLE

(71) Applicant: Cosemi Technologies, Inc., Irvine, CA (US)

(72) Inventors: Devang Parekh, Castro Valley, CA (US); Nguyen X. Nguyen, Irvine, CA (US)

(73) Assignee: Cosemi Technologies, Inc., Irvine, CA (US)

( * ) Notice: Subject to any disclaimer, the term of this patent is extended or adjusted under 35 U.S.C. 154(b) by 0 days.

(21) Appl. No.: 15/940,913

(22) Filed: Mar. 29, 2018

(51) Int. Cl.
*H01R 3/00* (2006.01)
*H01R 13/717* (2006.01)
*H01R 31/06* (2006.01)
*H01R 13/66* (2006.01)

(52) U.S. Cl.
CPC ..... *H01R 13/7175* (2013.01); *H01R 13/6683* (2013.01); *H01R 31/065* (2013.01)

(58) Field of Classification Search
CPC ............ H01R 13/7175; H01R 13/6683; H01R 31/065
USPC .................................. 439/490; 398/139, 141
See application file for complete search history.

(56) References Cited

U.S. PATENT DOCUMENTS

| | | | |
|---|---|---|---|
| 4,451,916 A | 5/1984 | Casper et al. | |
| 4,595,839 A * | 6/1986 | Braun | G02B 6/4202 250/227.24 |
| 5,668,419 A * | 9/1997 | Oktay | H01R 29/00 307/125 |
| 5,966,387 A | 10/1999 | Cloutier | |
| 6,446,867 B1 * | 9/2002 | Sanchez | G01R 31/002 235/454 |

(Continued)

FOREIGN PATENT DOCUMENTS

| | | |
|---|---|---|
| EP | 1978656 | 8/2008 |
| JP | 200955306 | 3/2009 |

(Continued)

OTHER PUBLICATIONS http://www.ophit.com/products/product_view.asp?boardid=1&num=6&ptitle=DVI%20fiber%20optic%20cable%20:%20DDI.

(Continued)

*Primary Examiner* — Abdullah A Riyami
*Assistant Examiner* — Vladimir Imas
(74) *Attorney, Agent, or Firm* — Loza & Loza, LLP; George L. Fountain

(57) ABSTRACT

A data communication cable that is capable of informing a user via light signals regarding any operational status of the cable and/or devices to which the cable is connected. The data communication cable includes a first connector configured to connect to a first device; a second connector configured to connect to a second device; one or more communication mediums configured to route a data signal and/or a power signal between the first and second devices; and one or more illumination fibers configured to emit light. The cable may further include a light driver circuit configured to generate a drive signal for the one or more illumination fibers based on detecting one or more events. Such events may include the cable receiving power, data signal activity or loss of signal activity in the one or more communications mediums, authentication or other operations performed between the first and second devices.

23 Claims, 7 Drawing Sheets

(56) References Cited

U.S. PATENT DOCUMENTS

| | | | |
|---|---|---|---|
| 6,607,307 B2 * | 8/2003 | Gilliland | G02B 6/4246 385/53 |
| 6,805,469 B1 * | 10/2004 | Barton | F21S 9/022 362/364 |
| 6,914,637 B1 * | 7/2005 | Wolf | H04L 1/0057 348/473 |
| 6,931,183 B2 | 8/2005 | Panak et al. | |
| 6,940,477 B2 | 9/2005 | Moon et al. | |
| 7,118,235 B2 * | 10/2006 | Barton | F21S 9/022 362/20 |
| 7,155,134 B2 | 12/2006 | Azadet | |
| 7,499,616 B2 * | 3/2009 | Aronson | G02B 6/4249 385/100 |
| 7,551,852 B2 | 6/2009 | Reintjes et al. | |
| 7,602,739 B2 | 10/2009 | Weigert | |
| 7,706,692 B2 | 4/2010 | Tatum et al. | |
| 7,714,677 B2 | 5/2010 | Wang | |
| 7,734,183 B2 | 6/2010 | Whitehead | |
| 7,860,398 B2 * | 12/2010 | Tatum | G02B 6/4201 398/139 |
| 7,861,277 B2 * | 12/2010 | Keady | H04L 25/02 327/530 |
| 7,908,634 B2 * | 3/2011 | Keady | H04L 25/02 327/530 |
| 7,941,052 B2 | 5/2011 | Epitaux et al. | |
| 8,068,742 B2 | 11/2011 | Cole et al. | |
| 8,215,963 B2 * | 7/2012 | Ichikawa | B60L 11/123 439/34 |
| 8,233,805 B2 | 7/2012 | Tatum et al. | |
| 8,251,594 B2 | 8/2012 | Lavoie et al. | |
| 8,272,023 B2 * | 9/2012 | Horan | G09G 5/003 327/530 |
| 8,804,792 B1 | 8/2014 | Cheung et al. | |
| 8,805,195 B2 | 8/2014 | Mateosky et al. | |
| 8,824,898 B2 | 9/2014 | Groepl et al. | |
| 8,831,436 B2 | 9/2014 | Evans et al. | |
| 8,935,740 B2 | 1/2015 | Suzuki et al. | |
| 8,948,197 B2 | 2/2015 | Jiang et al. | |
| 9,040,823 B2 | 5/2015 | Horan et al. | |
| 9,076,575 B2 | 7/2015 | Horan et al. | |
| 9,160,452 B2 * | 10/2015 | Louderback | H04B 10/077 |
| 9,397,750 B2 | 7/2016 | Parekh et al. | |
| 9,397,751 B2 | 7/2016 | Parekh et al. | |
| 9,602,116 B1 | 3/2017 | Le et al. | |
| 9,813,153 B2 | 11/2017 | Parekh et al. | |
| 2002/0126967 A1 | 9/2002 | Panak et al. | |
| 2002/0149821 A1 * | 10/2002 | Aronson | G01M 11/00 398/135 |
| 2003/0132941 A1 | 7/2003 | Echizenya | |
| 2003/0223756 A1 * | 12/2003 | Tatum | H04B 10/40 398/135 |
| 2004/0008996 A1 * | 1/2004 | Aronson | G02B 6/4246 398/202 |
| 2004/0056732 A1 | 3/2004 | Errington | |
| 2004/0070411 A1 | 4/2004 | Self et al. | |
| 2004/0184746 A1 * | 9/2004 | Chang | G09G 5/006 385/100 |
| 2004/0208600 A1 * | 10/2004 | Guenter | H04B 10/40 398/135 |
| 2004/0263941 A1 * | 12/2004 | Chen | G09G 5/006 359/245 |
| 2006/0024067 A1 | 2/2006 | Koontz | |
| 2006/0045437 A1 * | 3/2006 | Tatum | H01S 5/02248 385/92 |
| 2006/0221948 A1 | 10/2006 | Benner et al. | |
| 2006/0268167 A1 | 11/2006 | Cole et al. | |
| 2007/0014522 A1 | 1/2007 | Yamaguchi et al. | |
| 2007/0237463 A1 | 10/2007 | Aronson | |
| 2007/0237470 A1 | 10/2007 | Aronson et al. | |
| 2007/0286600 A1 | 12/2007 | Guo et al. | |
| 2008/0031629 A1 | 2/2008 | Nguyen et al. | |
| 2008/0107424 A1 | 5/2008 | Tonietto et al. | |
| 2009/0009662 A1 | 1/2009 | Manapragada et al. | |
| 2009/0260043 A1 | 10/2009 | Tatsuta et al. | |
| 2010/0150573 A1 | 6/2010 | Furuyama | |
| 2010/0284323 A1 | 11/2010 | Tang et al. | |
| 2011/0091219 A1 | 4/2011 | Tatum et al. | |
| 2011/0111642 A1 | 5/2011 | Sloey et al. | |
| 2012/0249871 A1 | 10/2012 | Nguyen et al. | |
| 2013/0147520 A1 | 6/2013 | Payne | |
| 2013/0243437 A1 | 9/2013 | Kishima et al. | |
| 2014/0346325 A1 | 11/2014 | Frank | |
| 2015/0110499 A1 | 4/2015 | Jiang et al. | |
| 2015/0295647 A1 | 10/2015 | Parekh et al. | |
| 2017/0054501 A9 | 2/2017 | Jiang et al. | |

FOREIGN PATENT DOCUMENTS

| | | |
|---|---|---|
| JP | 201124179 | 12/2011 |
| WO | 2008119669 | 10/2008 |
| WO | 2012059071 | 10/2012 |

OTHER PUBLICATIONS https://web.archive.org/web/20080611135155/http://www.ophit.com/html/main02-01-05.asp.

PCT/US12/57520. Int'l Search Report & Written Opinion (dated Feb. 1, 2013).

PCT/US12/57520. Int'l Prelim. Report of Patentability (dated Apr. 1, 2014).

PCT/US14/045310. Int'l Search Report & Written Opinion (dated Nov. 5, 2014).

Chinese Patent Application No. 201480038089.9, First Office Action dated Oct. 28, 2016.

Japanese Office Action for Japanese Application No. 2016-524354 dated Mar. 28, 2018, 3 pages.

* cited by examiner

LIGHT ILLUMINATING DATA COMMUNICATION CABLE

BACKGROUND

Field

Aspects of the present disclosure relate generally to data communication cables, and in particular, to a data communications cable that includes one or more illumination fibers and associated circuitry to provide defined illumination patterns based on a set of defined events, respectively.

Background

A data communication cable facilitates the transmission of data and optionally power between a pair of devices. In some cases, a user does not know whether the data communication cable or the devices are operating properly after installation of the cables onto the pair of devices. It is when the user attempts to perform data and/or power transfer between the pair of devices that the user is apprised of an issue. As the data communication cable is a critical component in the transfer of data and/or power between the connected devices, a data communication cable that is able to inform a user of any functional or operating issues would be desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a data communication cable including a first connector configured to connect to a first device; a second connector configured to connect to a second device; one or more communication mediums configured to route at least one of a data signal or a power signal between the first and second devices; and one or more illumination fibers configured to emit light.

Another aspect of the disclosure relates to a data communication cable including a first connector configured to connect to a first device; a second connector configured to connect to a second device; one or more communication mediums extending from the first connector to the second connector, wherein the one or more communication mediums are configured to route at least a data signal between the first and second devices; one or more illumination fibers configured to emit light, wherein the one or more illumination fibers extend in a direction from the first device towards the second device; a light driver circuit situated within the first or second connector, wherein the light driver circuit is configured to generate a drive signal for causing the one or more illumination fibers to emit light; and a sleeve configured to at least partially enclose the one or more communication mediums and the one or more illumination fibers, wherein the sleeve is at least partially transparent or translucent.

Another aspect of the disclosure relates to a data communication cable including a first connector configured to connect to a first device; a second connector configured to connect to a second device; one or more communication mediums extending from the first connector to the second connector, wherein the one or more communication mediums are configured to route at least a data signal between the first and second devices; one or more illumination fibers configured to emit light, wherein the one or more illumination fibers are situated within at least one of the first connector or the second connector; and one or more light driver circuits situated within at least one of the first connector or the second connector, wherein the one or more light driver circuits are configured to generate a drive signal for causing the one or more illumination fibers to emit light through at least the first connector or the second connector.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
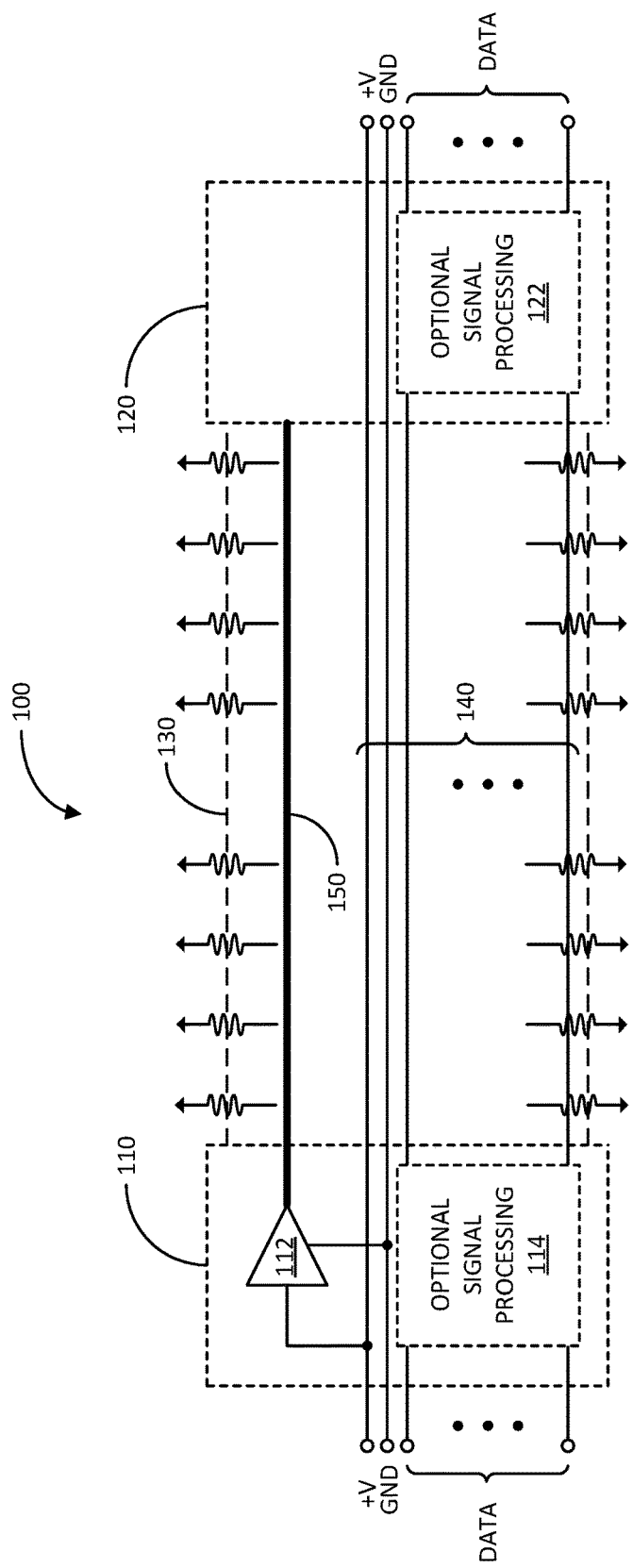
FIG. 1 illustrates a block/schematic diagram of an exemplary data communication cable that illuminates upon receiving power in accordance with an aspect of the disclosure.

FIG. 1 illustrates a block/schematic diagram of an exemplary data communication cable 100 in accordance with an aspect of the disclosure. In summary, the data communication cable 100 includes an illumination fiber that is configured to illuminate upon being connected to or receiving power from a first device connected to a first connector or upon receiving power from a second device connected to a second connector of the cable. As an example, the illumination of the fiber may indicate that the data communication cable is properly connected to the first and second devices at both ends of the cable.

In particular, the data communication cable 100 includes a first connector 110, a second connector 120, and at least a partial transparent or translucent sleeve 130 at least partially enclosing one or more communication mediums 140 and one or more illumination fibers 150.

The first connector 110 includes a first set of contacts for mating with a corresponding set of connector contacts of a first device (not shown). In this example, the first set of contacts are for providing and/or receiving data signals and power (+V and ground (GND)) to and/or from the first device. The first connector 110 may include an optional signal processing circuit 114 configured to perform one or more signal processing operations upon the data signals. Additionally, the first connector 110 includes a light driver circuit 112 for illuminating the one or more illumination fibers 150. The light driver circuit 112 may be electrically coupled to the power contacts of the first connector 110 for receiving power for illuminating the one or more illumination fibers 150.

The second connector 120 includes a second set of contacts for mating with a corresponding set of connector contacts of a second device (not shown). In this example, the second set of contacts are for providing and/or receiving data signals and power (+V and ground (GND)) to and/or from the second device. The second connector 120 may include an optional signal processing circuit 122 configured to perform one or more signal processing operations upon the data signals. Although in this example, the second connector 120 is not shown to include a light driver circuit coupled to an illumination fiber, it shall be understood that the data communication cable 100 may be configured to include such light driver circuit coupled to an additional illumination fiber.

As illustrated, the illumination fibers 150 may extend from the first connector 110 to the second connector 120. The illumination fibers 150 may include a light diffusing fiber, light emitting diode (LED) wire, and/or electroluminescent wire. Upon receiving a drive signal from the light driver circuit 112, the illumination fibers 150 emits light as represented by the photon symbols emanating from the illumination fiber 150 and exiting the cable via the transparent or translucent sleeve 130.

The one or more communication mediums 140 may be configured to route the data signals and/or the power signals from the first device via the first connector 110 to the second device via the second connector 120. As an example, the one or more communication mediums 140 may be configured as exclusively a set of one or more wires, exclusively as a set of one or more optical fibers, or a hybrid of a set of one or more wires and a set of one or more optical fibers. In this example, the power signals (+V and GND) may be transmitted by wires from the first connector 110 to the second connector 120, or vice-versa. The data signals may be transmitted via wires only, optical fibers only, or a hybrid of wires and optical fibers.

The optional signal processing circuit 114 of the first connector 110 may perform certain signal processing of data signals received from the first device for routing to the second device via the one or more communication mediums 140 and the second connector 120. As an example, if the data signal is to be sent via one or more wires 140, the signal processing circuit 114 may perform some signal conditioning on the data signal prior to applying the data signal to the one or more wires 140. As an example, such signal conditioning may include conditioning to compensate for adverse effects on the data signal caused by the transmission of the data signal via the one or more wires 140. For instance, such signal conditioning may include amplifying and/or pre-emphasizing (e.g., increasing the sharpness or slew rate of the transitions of the data signal).

As another example, if the data signal is to be sent via one or more optical fibers, then the signal processing circuit 114 may be configured to modulate electrical data signals onto one or more optical signals for 4 transmission via one or more optical fibers 140. As an example, the signal processing circuit 114 may include one or more laser drivers for generating one or more modulating signals based on the data signals, and one or more lasers for generating the optical signals based on the one or more modulated signals generated by the one or more laser drivers. Additionally, the signal processing circuit 114 may include one or more multiplexers for multiplexing the data signals and/or the modulated signals for driving one or more lasers.

Alternatively, or in addition to, the signal processing circuit 114 may perform signal processing of a data signal received from the second connector 120 via the communication medium 140 for transmission to the first device. As an example, if the data signal is received via one or more wires 140, the signal processing circuit 114 may perform signal conditioning to compensate the data signal for adverse effects (e.g., distortion) caused by the transmission of the data signal via the one or more wires 140. Such signal conditioning may include amplifying, buffering, and/or equalizing the data signal.

Similarly, if the data signal is received via one or more optical fibers 140, the signal processing circuit 114 may demodulate the optical data signals to generate electrical data signals for transmission to the first device. In this regard, the signal processing circuit 114 may include one or more photodiodes configured to convert the optical data signal into an electrical data signal, and electrical signal conditioning for conditioning the electrical data signals for compliant reception by the first device.

The signal processing circuit 122 of the second connector 120 may be configured similar to that of signal processing circuit 114 previously discussed in detail. In summary, if the signal processing circuit 122 is receiving data from the first device via the first connector 110 and one or more wires 140, the signal processing circuit 122 may include signal conditioning circuitry (e.g., amplifier, buffer, and/or equalizer) to compensate the data signal for adverse effects on the data signal caused by the wire transmission. If the signal processing circuit 122 is receiving data from the second device via the electrical contacts of the second connector 120 for transmission to the first device via the one or more wires 140 and the first connector 110, the signal processing circuit 122 may include circuitry (e.g., amplifier and/or pre-emphasizer) to compensate the data signal for adverse effects on the data signal to be introduced by the wire transmission.

If the signal processing circuit 122 is receiving data from the first device via the first connector 110 and one or more optical fibers 140 for transmission to the second device via the electrical contacts of the second connector 120, the signal processing circuit 122 may include circuitry (e.g., photodiode and electrical signal conditioner) for converting the optical signals to electrical signal for compliant for reception by the second device. If the signal processing circuit 122 is receiving data from the second device via the electrical contacts of the second connector 120 for transmission to the first device via the one or more optical fibers 140 and the first connector 110, the signal processing circuit 122 may include circuitry (e.g., laser driver(s), multiplexer(s) and laser(s)) to convert the electrical data signals to optical data signals for transmission via the one or more optical fibers 140.

The data communication cable 100 may be configured for different applications. For example, the data communication cable 100 may be configured as a High-Definition Multimedia Interface (HDMI) cable. In this regard, the power signals (+V and GND) are respectively on pins (electrical contacts) 18 and 17 of the first and second connectors 110 and 120. The data signals for transmission of multimedia data (video and/or audio) are the transition-minimized differential signaling (TDMS) signals on pins 1 to 12 of the first and second connectors 110 and 120. The data signals for transmission of control data and clock, such as Consumers Electronics Control (CEC), Display Data Channel (DDC) clock, and DDC data are respectively on pins 13 15, and 16 of the first and second connectors 110 and 120. And, the data signals for optional HDMI Ethernet Channel or Audio Return Channels are on pins 14 and 19 of the first and second connectors 110 and 120, with pin 19 also serving as an optional Hot Plug Detect.

As another example, the data communication cable 100 may be configured as a DisplayPort cable. In this regard, the power signals (+V and GND) are on pin 20 for +V and pins 2, 5, 8, 11, and 16 for GND of the first and second connectors 110 and 120. The data signals for transmission of multimedia data (video and/or audio) are on pins 1, 3, 4, 6, 7, 9, 10, and 12. The data signals for transmission of control/status signals such as the Auxiliary (AUX) channel are on pins 15 and 17 of the first and second connectors 110 and 120. Other data signal for transmission of Hot Plug Detect function is on pin 18. The above are just merely examples, and the data communication cable 100 may be configured compliant with other standards, such as Digital Visual Interface (DVI), Universal Serial Bus (USB), and Quad Small Form-factor Pluggable (QSFP).

As discussed above, when the data communication cable 100 is connected to the first and second devices, and the first and second devices are turned on, the light driver circuit 112 receives the power signals (+V and GND). In response to receiving the power signals, the light driver circuit 112 generates a drive signal to cause the illumination fiber 150 to illuminate. The illumination provides a user an indication that the data communication cable 100 has been properly connected to the first device and/or the second device. The voltage +V of the power signals may be generated by the first device or the second device. Thus, in this example, the event that triggers the illumination of the fiber 150 is receiving power from the first or second device when the data communication cable is properly connected to the first and/or second device. As discussed further herein, other events may trigger the illumination of one or more illumination fibers of a data communication cable.

Figure 2:
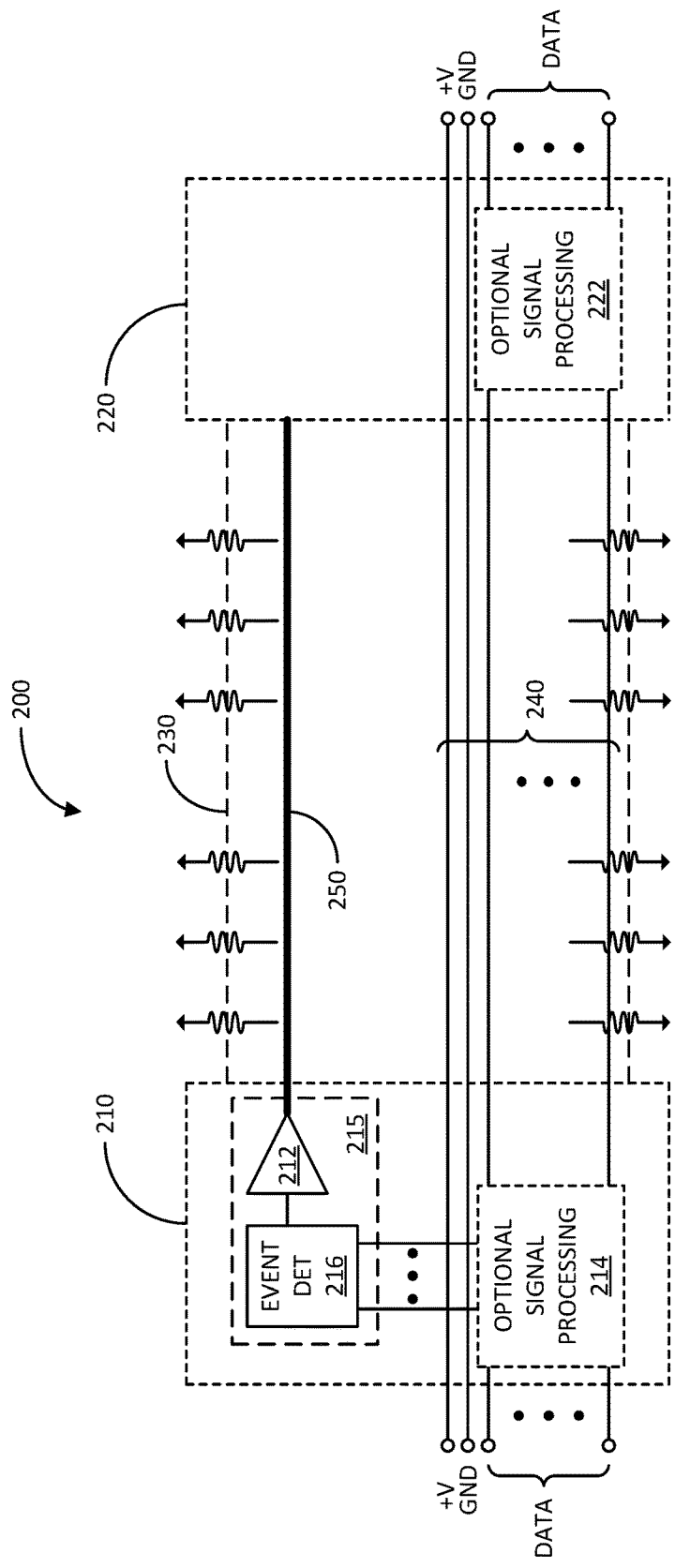
FIG. 2 illustrates a block/schematic diagram of an exemplary data communication cable that illuminates upon detecting signal activity in one or more communication mediums of the cable in accordance with another aspect of the disclosure.

FIG. 2 illustrates a block/schematic diagram of an exemplary data communication cable 200 in accordance with another aspect of the disclosure. In summary, the data communication cable 200 includes an illumination fiber that illuminates in response to signal activity on one or more data communication mediums. The illumination provides an indication that data is being transferred between first and second devices via the data communication cable 200.

In particular, the data communication cable 200 includes a first connector 210, a second connector 220, and at least a partially transparent or translucent sleeve 230 for at least partially enclosing one or more communication mediums 240 and one or more illumination fibers 250. As in the previous cable 100, the one or more illumination fibers 250 may include a light diffusing fiber, an LED wire, and/or an electroluminescent wire. Similarly, the one or more communication mediums 240 may be configured as exclusively one or more electrical wires, exclusively one or more optical fibers, or a hybrid of one or more electrical wires and one or more optical fibers.

Similar to cable 100, the first connector 210 of data communication cable 200 includes a set of electrical contacts (e.g., +V, GND, and DATA) for mating with a set of connector contacts of a first device (not shown). Via the set of electrical contacts, the first connector 210 may provide and/or receive power and data signals to and/or from the first device. The first connector 210 may also include a signal processing circuit 214 to perform one or more signal processing on the data signals, as discussed in detail with reference to signal processing circuit 114 of cable 100.

Similar to cable 100, the second connector 220 of data communication cable 200 includes a set of electrical contacts (e.g., +V, GND, and DATA) for mating with a set of connector contacts of a second device (not shown). Via the set of electrical contacts, the second connector 220 may provide and/or receive power and data signals to and/or from the second device. The second connector 220 may also include a signal processing circuit 222 to perform one or more signal processing on the data signals, as discussed in detail with reference to signal processing circuit 122 of cable 100.

In data communication cable 200, the first connector 210 further includes a light driver circuit 215 including an event detector 216 and a driver 212. The event detector 216 is configured to detect signal activity in one or more of the communication mediums 240. In response to detecting signal activity in one or more of the communication mediums 240, the event detector 216 activates the driver 212 to generate a drive signal for illuminating the illumination fiber 250. If no signal activity is detected, the event detector 216 does not activate the driver 212 so that the illumination fiber 250 does not illuminate.

As an example, if the data communication cable 200 is implemented as an HDMI cable, the signal activity detected by the event detector 216 may be data signal activity on the DDC communication medium. As another example, if the data communication cable 200 is implemented as a DisplayPort cable, the signal activity detected by the event detector 216 may be data signal activity on the AUX channel communication medium.

In a similar manner, the event detector 216 may be configured to detect signal inactivity or loss of signal in one or more communication mediums 240. That is, in one implementation, the event detector 216 and illumination driver 212 are configured to not generate the drive signal for the illumination fiber 250 when there is signal activity on the one or more communication mediums 240. However, upon detecting signal activity on the one or more communication mediums 240, the event detector 216 and illumination driver 212 are configured to generate the drive signal to cause the illumination fiber 250 to illuminate. Such configuration provides a user notification that there may exist loss of signal condition.

Alternatively, instead of the event detector 216 and driver 212 being configured to not illuminate the illumination fiber 250 when there is no signal activity or when there is signal activity on one or more of the communication mediums 240, these devices may be configured to illuminate the illumination fiber 250 with a first characteristic when there is signal activity and illuminate the illumination fiber 250 with a second characteristic when there is no signal activity. For example, the event detector 216 and driver 212 may cause the illumination fiber 250 to illuminate with a particular hue (e.g., green) when there is signal activity, and cause the illumination fiber 250 to illuminate with different hue (e.g., red) when there is no signal activity. As another example, the event detector 216 and driver 212 may cause the illumination fiber 250 to illuminate continuously when there is signal activity, and cause the illumination fiber 250 to strobe in a particular manner when there is no signal activity.

Although, in this example, the second connector 220 is illustrated as not including a light driver circuit, it shall be understood that the second connector 220 may include such in order to illuminate the same or another illumination fiber based on signal activity on the same or other one or more communication mediums 240. Further, although not specifically illustrated, the light driver circuit (whether in the first and/or second connector) may receive power from the power mediums (+V and GND); or alternatively, or in addition to, from an internal battery or from a third device via a another port (e.g., USB port) that may be implemented into the first connector 210 and/or second connector 220.

Figure 3:
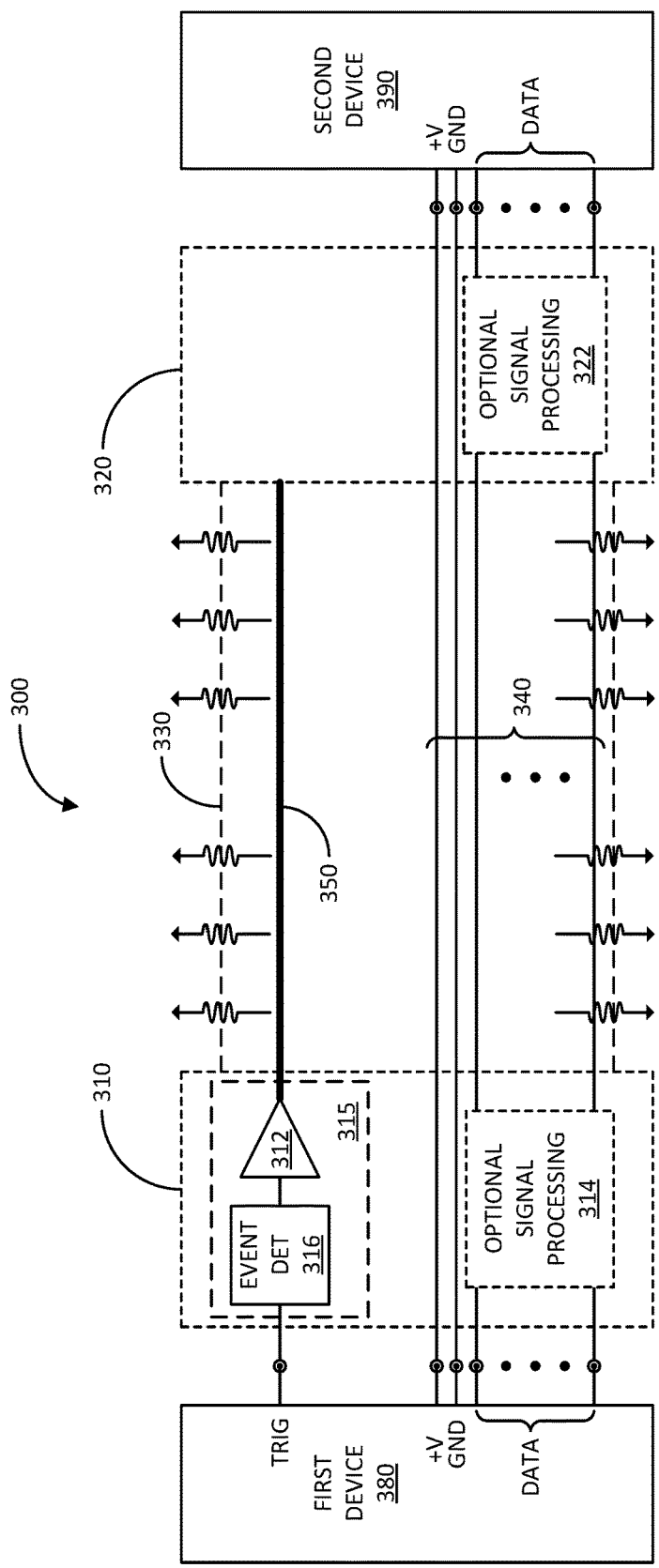
FIG. 3 illustrates a block/schematic diagram of an exemplary data communication cable that illuminates upon receiving a triggering signal from a device to which the cable is connected in accordance with another aspect of the disclosure.

FIG. 3 illustrates a block/schematic diagram of another exemplary data communication cable 300 in accordance with another aspect of the disclosure. In summary, the data communication cable 300 includes an illumination fiber that illuminates in response to receiving a triggering signal from a device to which it is connected. The illumination may provide an indication that the first device has authenticated the second device for allowing data communication between each other. Or, such triggering signal may provide other indications, such as error in data transfer.

In particular, the data communication cable 300 includes a first connector 310, a second connector 320, and at least a partially transparent or translucent sleeve 320 for at least partially enclosing one or more communication mediums 340 and one or more illumination fibers 350. As in the previous cables 100 and 200, the one or more illumination fibers 350 may include a light diffusing fiber, an LED wire, and/or an electroluminescent wire. Similarly, the one or more communication mediums 340 may be configured as exclusively one or more electrical wires, exclusively one or more optical fibers, or a hybrid of one or more electrical wires and one or more optical fibers.

Similar to cables 100 and 200, the first connector 310 of data communication cable 300 includes a set of electrical contacts (e.g., +V, GND, and DATA) for mating with a set of connector contacts of a first device 380. Via the set of electrical contacts, the first connector 310 may provide and/or receive power and data signals to and/or from the first device 380. The first connector 310 may also include a signal processing circuit 314 to perform one or more signal processing on the data signals, as discussed in detail with reference to signal processing circuit 114 of cable 100.

Similar to cables 100 and 200, the second connector 320 of data communication cable 300 includes a set of electrical contacts (e.g., +V, GND, and DATA) for mating with a set of connector contacts of a second device 390. Via the set of electrical contacts, the second connector 320 may provide and/or receive power and data signals to and/or from the second device 390. The second connector 320 may also include a signal processing circuit 322 to perform one or more signal processing on the data signals, as discussed in detail with reference to signal processing circuit 122 of cable 100.

In data communication cable 300, the first connector 310 further includes a light driver circuit 315 including an event detector 316 and a driver 312. The event detector 316 is configured to receive a triggering signal from the first device 380. In response to the triggering signal, the event detector 316 activates the driver 312 to generate a drive signal for illuminating the illumination fiber 350. If no triggering signal is received, the event detector 316 does not activate the driver 312 so that the illumination fiber 350 does not illuminate.

As an example, if the data communication cable 300 is implemented as an HDMI cable, the first device 380 may be an HDMI source device (e.g., a digital video recorder (DVR), optical disc player, video camera, etc.) and the second device 390 may be an HDMI sink device (e.g., a display, a DVR, projector, etc.). The first device 380 may generate the triggering signal upon a successful Hot Plug Detect operation with the second device 390. In a Hot Plug Detect operation, when the HDMI source 380 is powered on and connected to a powered on HDMI sink 390 via the data communication cable 300, Extended Display Identification Data (EDID) may be sent from the HDMI sink 390 to the HDMI source 380 via the DDC communication medium 340 of the cable 300. The EDID contains information about the multimedia format and resolution negotiated between the devices 380 and 390.

Thus, upon receiving the EDID or completing the Hot Plug Detect operation, the first device 380 may generate the triggering signal to cause the event detector 316 and driver 312 to illuminate the illumination fiber 350. This provides an indication to a user that such operation has been successfully completed by the first and second devices 380 and 390.

As in the previous cable 300, the light driver circuit 315 may be configured to operate in the opposite manner, i.e., illuminate the illumination fiber 350 prior to Hot Plug Detect or receiving the EDID and cease illuminating the illumination fiber 350 after completing the Hot Plug Detect or receiving the EDID. Alternatively, the light driver circuit 315 may be configured to illuminate the illumination fiber 350 with a particular characteristic (e.g., with a particular hue or light strobing manner) prior to Hot Plug Detect or receiving the EDID, and illuminate the illumination fiber 350 with a different characteristic (e.g., another hue or another manner of light strobing) after completing the Hot Plug Detect or receiving the EDID.

The first device 380 may generate the triggering signal upon performing other operations. For example, the first device 380 may generate the triggering signal upon performing successful high-bandwidth digital content protection (HDCP) handshake operation or detecting an error in the HDCP handshake. Such HDCP handshake may be performed in an HDMI or DisplayPort environment. HDCP is a digital copy protection process where the first device 380 authenticates the second device 390 (e.g., a successful HDCP handshake). If the first device 380 fails to authenticate the second device 390 (e.g., error in the HDCP handshake), the first device 380 does not send data to the second device 390. Thus, the illumination in this case informs a user as to whether a successful HDCP or authentication process has occurred between the first and second devices.

The first device 380 may generate the triggering signal based on other detected events. Such events may include error in the transmission of the data between the first and second devices 380 and 390; loss of the data signal being transmitted between the first and second devices 380 and 390; whether power is being delivered from the first device 380 to the second device 390 or vice-versa; or whether the Audio Return Channel (ARC) is enabled.

Although, in this example, the second connector 320 is illustrated as not including a light driver circuit, it shall be understood that the second connector 320 may include such in order to illuminate the same or another illumination fiber based on a triggering signal received from the second device 390. Further, although not specifically illustrated, the light driver circuit (whether in the first and/or second connector) may receive power from the power mediums (+V and GND); or alternatively, or in addition to, from an internal battery or a third device via another port (e.g., USB port) that may be implemented into the first connector 310 and/or second connector 320.

Figure 4:
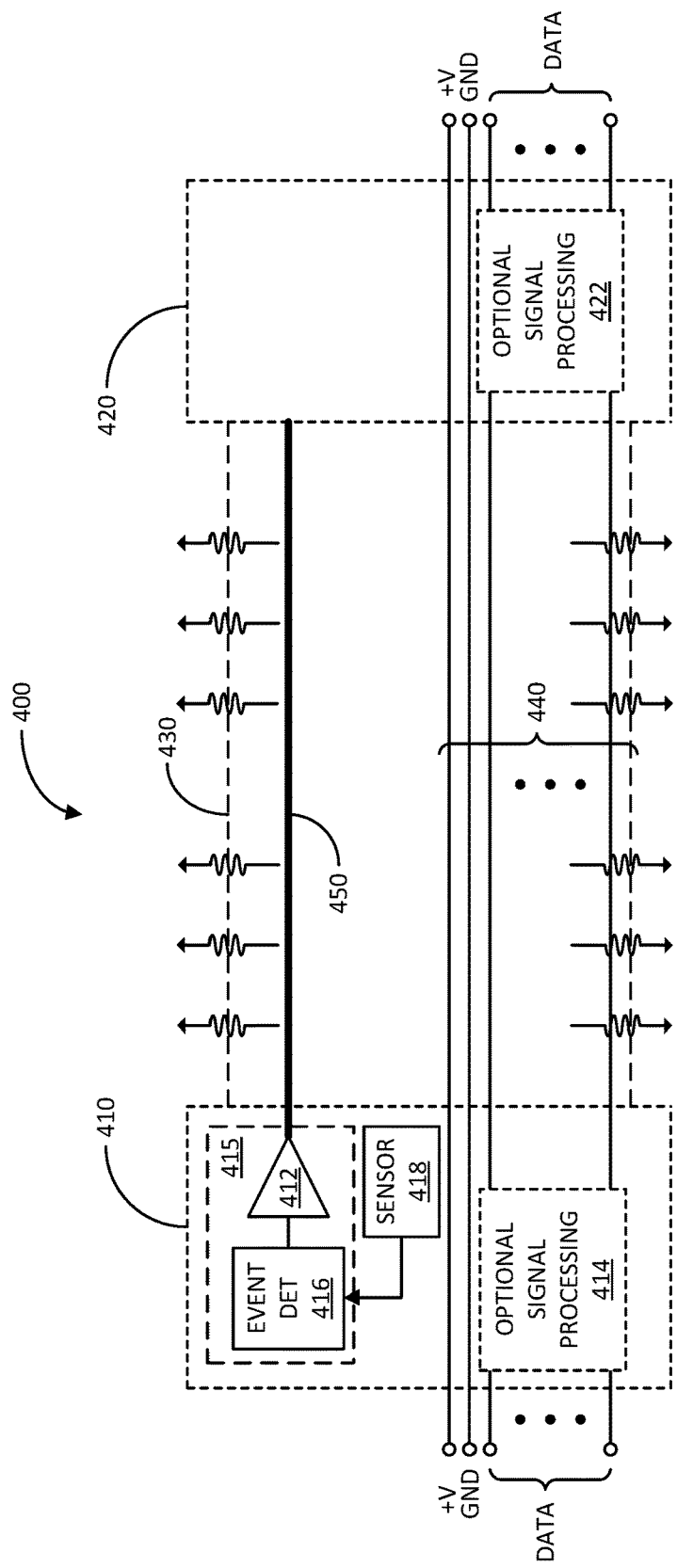
FIG. 4 illustrates a block/schematic diagram of an exemplary data communication cable that illuminates upon receiving a signal from an internal sensor or device in accordance with another aspect of the disclosure.

FIG. 4 illustrates a block/schematic diagram of an exemplary data communication cable 400 in accordance with another aspect of the disclosure. In summary, the data communication cable 400 includes an illumination fiber that illuminates in response to a signal generated by a device internal to the cable. The illumination may provide an indication that there may be a problem with the cable, such as an overheating or other problem.

In particular, the data communication cable 400 includes a first connector 410, a second connector 420, and at least a partially transparent or translucent sleeve 420 at least partially enclosing one or more communication mediums 440 and one or more illumination fibers 450. As in the previous cables, the one or more illumination fibers 450 may include a light diffusing fiber, an LED wire, and/or an electroluminescent wire. Similarly, the one or more communication mediums 440 may be configured as exclusively one or more electrical wires, exclusively one or more optical fibers, or a hybrid of one or more electrical wires and one or more optical fibers.

Similar to the previous cables, the first connector 410 of data communication cable 400 includes a set of electrical contacts (e.g., +V, GND, and DATA) for mating with a set of connector contacts of a first device (not shown). Via the set of electrical contacts, the first connector 410 may provide and/or receive power and data signals to and/or from the first device. The first connector 410 may also include a signal processing circuit 414 configured to perform one or more signal processing on the data signals, as discussed in detail with reference to signal processing circuit 114 of cable 100.

Similar to the previous cables, the second connector 420 of data communication cable 400 includes a set of electrical contacts (e.g., +V, GND, and DATA) for mating with a set of connector contacts of a second device (not shown). Via the set of electrical contacts, the second connector 420 may provide and/or receive power and data signals to and/or from the second device. The second connector 420 may also include a signal processing circuit 422 configured to perform one or more signal processing on the data signals, as discussed in detail with reference to signal processing circuit 122 of cable 100.

In data communication cable 400, the first connector 410 further includes a sensor 418 and a light drive circuit 415 including an event detector 416 and a driver 412. The sensor 418, being an example of an internal device, may generate a signal based on the particular application for the sensor. For example, the sensor 418 could be a temperature sensor or other device that generates a signal based on a monitored parameter. The event detector 416 is configured to receive the signal from the sensor 418. In response to the signal, the event detector 416 activates the driver 412 to generate a drive signal for illuminating the illumination fiber 450.

As an example, if the event detector 416 detects that the signal generated by the sensor 418 indicates a sensed temperature above a threshold, the event detector 416 activates the driver 412 to cause the illumination fiber 450 to illuminate; otherwise, the illumination fiber 450 remains unilluminated. As in the previous cable, the event detector 416 via the driver 412 may cause the illumination fiber 450 to illuminate if the sensed temperature is below the threshold; and not illuminate if above the threshold. Alternatively, the event detector 416 via the driver 412 may cause the illumination fiber 450 to illuminate with a particular characteristic (e.g., a particular hue or strobing pattern) if the sensed temperature is below the threshold; and to illuminate with a different characteristic (e.g., a different hue or strobing pattern) if the sensed temperature is above the threshold.

Although, in this example, the second connector 420 is illustrated as not including a sensor and a light driver circuit, it shall be understood that the second connector 420 may include such in order to illuminate the same or another illumination fiber based on a signal generated by a sensor incorporated into the second connector. Further, although not specifically illustrated, the sensor and light driver circuit (whether in the first and/or second connector) may receive power from the power mediums (+V and GND); or alternatively, or in addition to, from an internal battery or a third device via another port (e.g., USB port) that may be implemented into the first connector 410 and/or second connector 420.

Figure 5:
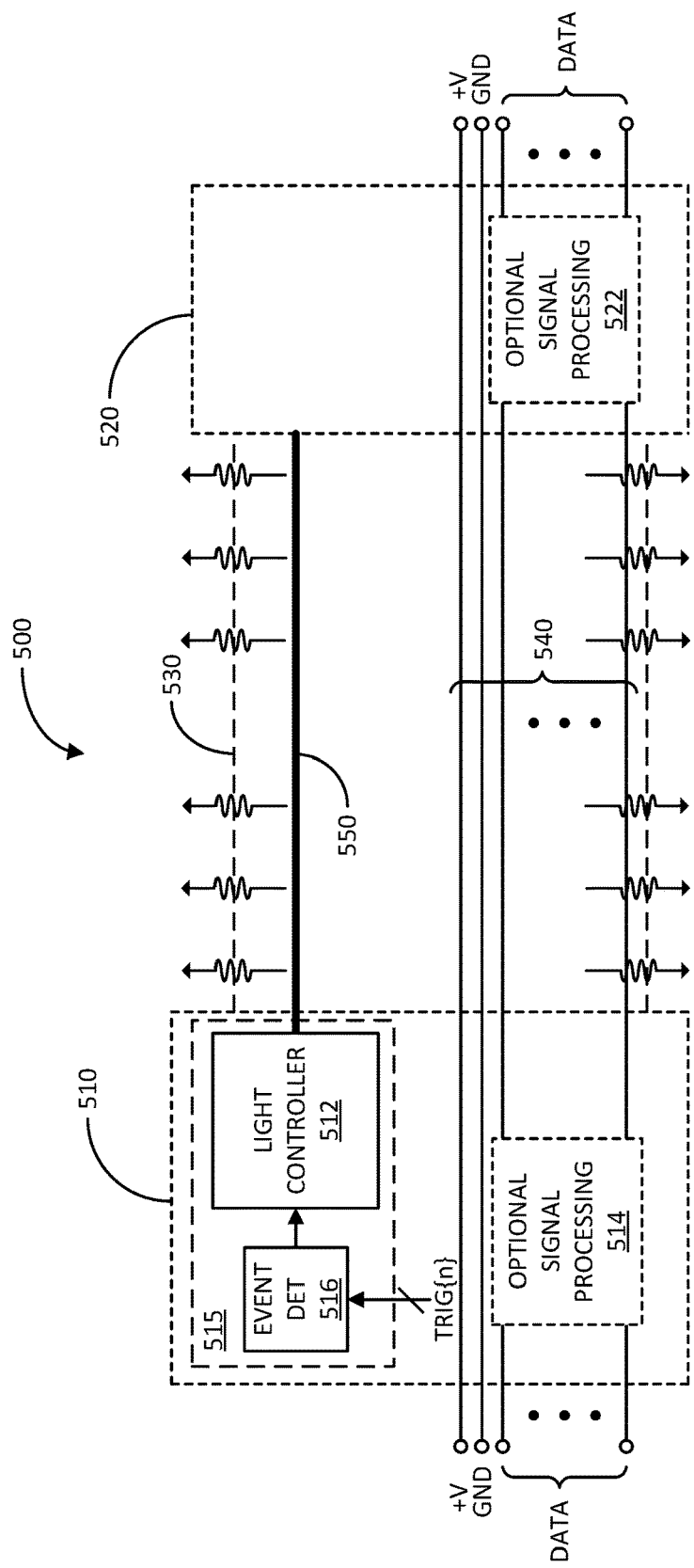
FIG. 5 illustrates a block/schematic diagram of an exemplary data communication cable that illuminates with a set of distinct characteristics based on a set of triggering signals in accordance with another aspect of the disclosure.

FIG. 5 illustrates a block/schematic diagram of an exemplary data communication cable 500 in accordance with another aspect of the disclosure. In summary, the data communication cable 500 includes an event detector that may detect a set of triggering events, and a light pattern controller configured to illuminate an illumination fiber with a set of characteristics based on the set of triggering events, respectively. The illumination may provide an indication to a user as to the occurrence of a particular event among a set of triggering events.

In particular, the data communication cable 500 includes a first connector 510, a second connector 520, and at least a partially transparent or translucent sleeve 520 at least partially enclosing one or more communication mediums 540 and one or more illumination fibers 550. As in the previous cables, the one or more illumination fibers 550 may include a light diffusing fiber, an LED wire, and/or an electroluminescent wire. Similarly, the one or more communication mediums 540 may be configured as exclusively one or more electrical wires, exclusively one or more optical fibers, or a hybrid of one or more electrical wires and one or more optical fibers.

Similar to the previous cables, the first connector 510 of data communication cable 500 includes a set of electrical contacts (e.g., +V, GND, and DATA) for mating with a set of connector contacts of a first device (not shown). Via the set of electrical contacts, the first connector 510 may provide and/or receive power and data signals to and/or from the first device. The first connector 510 may also include a signal processing circuit 514 configured to perform one or more signal processing on the data signals, as discussed in detail with reference to signal processing circuit 114 of cable 100.

Similar to the previous cables, the second connector 520 of data communication cable 500 includes a set of electrical contacts (e.g., +V, GND, and DATA) for mating with a set of connector contacts of a second device (not shown). Via the set of electrical contacts, the second connector 520 may provide and/or receive power and data signals to and/or from the second device. The second connector 520 may also include a signal processing circuit 522 configured to perform one or more signal processing on the data signals, as discussed in detail with reference to signal processing circuit 122 of cable 100.

In data communication cable 500, the first connector 510 further includes a light driver circuit 515 including an event detector 516 and a light controller 512. The event detector 516 is configured to receive a set of distinct triggering signals TRIG{n}. In response to the set of distinct triggering signals TRIG{n}, the event detector 516 provides a set of control signals to the light controller 512 to generate a set of drive signals for illuminating the illumination fiber 550 with a set of distinct characteristics, respectively.

As an example, the set of triggering signals TRIG{n} may indicate a set of events occurring, respectively. For example, a first triggering signal TRIG{1} of the set TRIG{n} may indicate that the data communication cable 500 has successfully received power from either the first device or the second device. In response to the first triggering signal TRIG{1}, the event detector 516 sends a first code mapped to the first triggering signal TRIG{1} to the light controller 512. In response to the first code, the light controller 512 causes the illumination fiber 550 to illuminate with a particular characteristic. For instance, if power is being receive, the light controller 512 may cause the illumination fiber 550 to illuminate with a green hue.

As another example, a second triggering signal TRIG{2} of the set TRIG{n} may indicate that the first device has failed to authenticate the second device (e.g., an unsuccessful HDCP handshake). In response to the second triggering signal TRIG{2}, the event detector 516 sends a second code mapped to the second triggering signal TRIG{2} to the light controller 512. In response to the second code, the light controller 512 causes the illumination fiber 550 to illuminate with a different characteristic, such as with continuous yellow hue.

Considering yet another example, a third triggering signal TRIG{3} of the set TRIG{n} may indicate that the first device has failed to perform a Hot Plug Detect operation. In response to the third triggering signal TRIG{3}, the event detector 516 sends a third code mapped to the third triggering signal TRIG{3} to the light controller 512. In response to the third code, the light controller 512 causes the illumination fiber 550 to illuminate with yet another different characteristic, such as with a flashing red hue.

Thus, with the data communication cable 500, a set of triggering events causes the illumination fiber 550 to illuminate with a set of distinct characteristics. A user observing the illumination characteristic of the illumination fiber 550 is able to know whether a certain event is occurring based on the particular illumination characteristic of the illumination fiber 550. It shall be understood that the light controller 512 may be coupled to a set of illumination fibers positioned within different longitudinal location within the sleeve 530 so that each of the fibers may inform a user of a particular event occurring.

Although, in this example, the second connector 520 is illustrated as not including a light driver circuit, it shall be understood that the second connector 520 may include such in order to illuminate the same or another illumination fiber based events detected at the second connector 520, as discussed in further detail with reference to a following exemplary cable implementation. Further, although not specifically illustrated, the event detector and/or the light controller (whether in the first and/or second connector) may receive power from the power mediums (+V and GND); or alternatively, or in addition to, from an internal battery or a third device via another port (e.g., USB port) that may be implemented into the first connector 510 and/or second connector 520.

Figure 6:
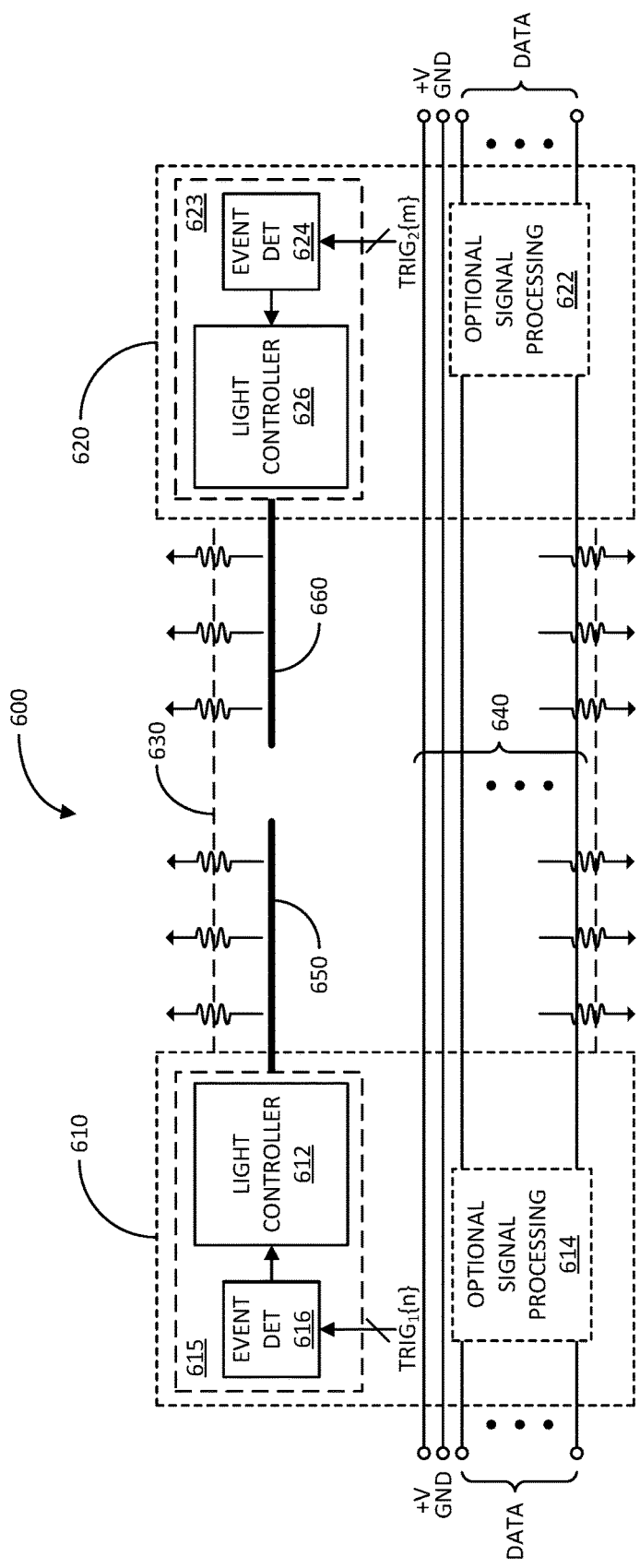
FIG. 6 illustrates a block/schematic diagram of an exemplary data communication cable that includes two or more illumination fibers driven by circuitry at both ends of the cable in accordance with another aspect of the disclosure.

FIG. 6 illustrates a block/schematic diagram of an exemplary data communication cable 600 in accordance with another aspect of the disclosure. In summary, the data communication cable 600 includes a first light driver circuit including a first event detector and a first light controller in a first connector configured to illuminate a first illumination fiber with a first set of characteristics based on a first set of triggering events, respectively. The data communication cable 600 includes a second light driver including a second event detector and a second light controller in a second connector configured to illuminate a second illumination fiber with a second set of characteristics based on a second set of triggering events, respectively. The illumination may provide an indication to a user as to the occurrence of a particular event associated with the first connector or first device based on an illumination characteristic of the first illumination fiber, and to the occurrence of another particular event associated with the second connector or second device based on an illumination characteristic of the second illumination fiber.

In particular, the data communication cable 600 includes a first connector 610, a second connector 620, and at least a partially transparent or translucent sleeve 630 at least partially enclosing one or more communication mediums 640 and at least first and second illumination fibers 650 and 660. As in the previous cables, the first and second illumination fibers 650 and 660 may each be configured as a light diffusing fiber, an LED wire, and/or an electroluminescent wire, and need not be of the same type. Similarly, the one or more communication mediums 640 may be configured as exclusively one or more electrical wires, exclusively one or more optical fibers, or a hybrid of one or more electrical wires and one or more optical fibers.

Similar to the previous cables, the first connector 610 of data communication cable 600 includes a set of electrical contacts (e.g., +V, GND, and DATA) for mating with a set of connector contacts of a first device (not shown). Via the set of electrical contacts, the first connector 610 may provide and/or receive power and data signals to and/or from the first device. The first connector 610 may also include a signal processing circuit 614 configured to perform one or more signal processing on the data signals, as discussed in detail with reference to signal processing circuit 114 of cable 100.

Similar to the previous cables, the second connector 620 of data communication cable 600 includes a set of electrical contacts (e.g., +V, GND, and DATA) for mating with a set of connector contacts of a second device (not shown). Via the set of electrical contacts, the second connector 620 may provide and/or receive power and data signals to and/or from the second device. The second connector 620 may also include a signal processing circuit 622 configured to perform one or more signal processing on the data signals, as discussed in detail with reference to signal processing circuit 122 of cable 100.

The first connector 610 further includes a first light driver circuit 615 including a first event detector 616 and a first light controller 612. The first event detector 616 is configured to receive a first set of distinct triggering signals $TRIG_1\{n\}$. In response to the first set of distinct triggering signals $TRIG_1\{n\}$, the first event detector 616 provides a first set of control signals to the first light controller 612 to generate a first set of drive signals so that the first illumination fiber 650 illuminates with a first set of distinct characteristics (e.g., different hues or strobing patterns), respectively.

Similarly, the second connector 620 further includes a second light driver 623 including a second event detector 624 and a second light controller 626. The second event detector 624 is configured to receive a second set of distinct triggering signals $TRIG_2\{m\}$. In response to the second set of distinct triggering signals $TRIG_2\{m\}$, the second event detector 624 provides a second set of control signals to the second light controller 626 to generate a second set of drive signals so that the second illumination fiber 660 illuminates with a second set of distinct characteristics, respectively.

The first set of triggering events $TRIG_1\{n\}$ need not be the same as the second set of triggering events $TRIG_2\{m\}$, although both sets may have one or more common events. As an example, the first set of triggering events $TRIG_1\{n\}$ may be more associated with the first connector 610 or the first device, and the second set of triggering events $TRIG_2\{m\}$ may be more associated with the second connector 620 or the second device. The number n of events in the first set $TRIG_1\{n\}$ may be the same or different than the number m of events in the second set $TRIG_2\{m\}$.

As in the prior cables, the event detectors 616 and 624 and the light controllers 612 and 626 may receive power from the power mediums (+V and GND); or alternatively, or in addition to, from an internal battery or a third device via another port (e.g., USB port) that may be implemented into the first connector 610 and/or second connector 620.

Figure 7:
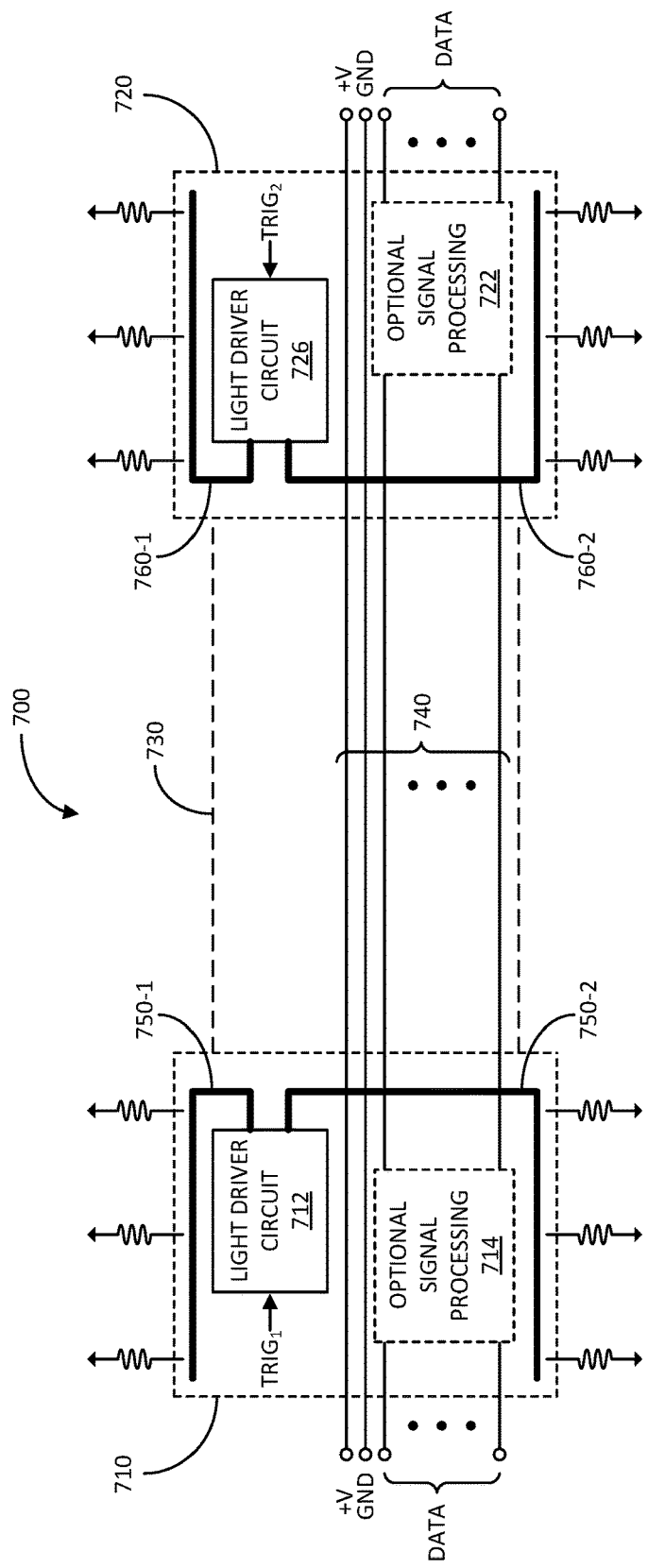
FIG. 7 illustrates a block/schematic diagram of an exemplary data communication cable that includes illumination fibers situated within connectors of the cable in accordance with another aspect of the disclosure.

FIG. 7 illustrates a block/schematic diagram of an exemplary data communication cable 700 in accordance with another aspect of the disclosure. In summary, the data communication cable 700 includes illumination fibers within the connectors of the cable. The connectors may be configured to have at least partially transparent or translucent housing to allow light emitted by the illumination fibers to be perceived by a user.

In particular, the data communication cable 700 includes a first connector 710, a second connector 720, and a sleeve 730 for at least partially enclosing one or more communication mediums 740. The data communication mediums 740 may be configured as exclusively one or more electrical wires, exclusively one or more optical fibers, or a hybrid of one or more electrical wires and one or more optical fibers.

The first connector 710 of data communication cable 700 includes a set of electrical contacts (e.g., +V, GND, and DATA) for mating with a set of connector contacts of a first device (not shown). Via the set of electrical contacts, the first connector 710 may provide and/or receive power and data signals to and/or from the first device. The first connector 710 may also include a signal processing circuit 714 configured to perform one or more signal processing on the data signals, as discussed in detail with reference to signal processing circuit 114 of cable 100.

Similar to the previous cables, the second connector 720 of data communication cable 700 includes a set of electrical contacts (e.g., +V, GND, and DATA) for mating with a set of connector contacts of a second device (not shown). Via the set of electrical contacts, the second connector 720 may provide and/or receive power and data signals to and/or from the second device. The second connector 720 may also include a signal processing circuit 722 configured to perform one or more signal processing on the data signals, as discussed in detail with reference to signal processing circuit 122 of cable 100.

The first connector 710 further includes a light driver circuit 712 and one or more illumination fibers 750-1 and 750-2. Each of the illumination fibers 750-1 and 750-2 may each be configured as a light diffusing fiber, an LED wire, and/or an electroluminescent wire, and need not be of the same type. The light driver circuit 712 is configured to receive one or more triggering signals $TRIG_1$. In response to the one or more triggering signals $TRIG_1$, the light driver circuit 712 generates one or more drive signals to illuminate the illumination fibers 750-1 and 750-2 based on the one or more triggering signals $TRIG_1$. The connector 710 may be configured to include at least a partially transparent or translucent housing to allow the light emitted by the illumination fibers 750-1 and 750-2 to be perceived by a user.

The second connector 720 further includes a light driver circuit 726 and one or more illumination fibers 760-1 and 760-2. Each of the illumination fibers 760-1 and 760-2 may each be configured as a light diffusing fiber, an LED wire, and/or an electroluminescent wire, and need not be of the same type. The light driver circuit 726 is configured to receive one or more triggering signals $TRIG_2$. In response to the one or more triggering signals $TRIG_2$, the light driver circuit 726 generates one or more drive signals to illuminate the illumination fibers 760-1 and 760-2 based on the one or more triggering signals $TRIG_2$. The connector 720 may be configured to include at least a partially transparent or translucent housing to allow the light emitted by the illumination fibers 760-1 and 760-2 to be perceived by a user.

As in the prior cables, the light driver circuits 712 and 726 may receive power from the power mediums (+V and GND); or alternatively, or in addition to, from an internal battery or a third device via another port (e.g., USB port) that may be implemented into the first connector 710 and/or second connector 720.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data communication cable, comprising:
    a first connector configured to connect to a first device;
    a second connector configured to connect to a second device;
    one or more communication mediums configured to route at least one of a data signal or a power signal between the first and second devices; and
    one or more illumination fibers configured to emit light, each of the one or more illumination fibers not configured to route signal from the first device to the second device or vice-versa.

2. The data communication cable of claim 1, further comprising a light driver circuit configured to generate a drive signal for causing the one or more illumination fibers to emit light.

3. The data communication cable of claim 2, wherein the light driver circuit is configured to generate the drive signal in response to receiving the power signal.

4. The data communication cable of claim 2, wherein the light driver circuit is configured to generate or cease generating the drive signal in response to detecting the data signal from the one or more communication mediums.

5. The data communication cable of claim 4, wherein the data signal includes a Display Data Channel (DDC) data signal or Auxiliary (AUX) Channel data signal.

6. The data communication cable of claim 2, wherein the light driver circuit is configured to generate or cease generating the drive signal in response to not detecting the data signal from the one or more communication mediums.

7. The data communication cable of claim 2, wherein the light driver circuit is configured to generate or cease generating the drive signal in response to receiving a triggering signal from the first device or the second device.

8. The data communication cable of claim 7, wherein the triggering signal indicates a result of an authentication operation performed between the first and second devices.

9. The data communication cable of claim 7, wherein the triggering signal indicates a result of a successful transfer of the data signal between the first and second devices.

10. The data communication cable of claim 7, wherein the data signal includes Extended Display Identification Data (EDID) information, and the triggering signal indicates whether the first device received the EDID information from the second device.

11. The data communication cable of claim 7, wherein the triggering signal indicates whether an Audio Return Channel (ARC) is available.

12. The data communication cable of claim 2, further comprising a sensor configured to generate a signal based on a sensed parameter, wherein the light driver circuit is configured to generate or cease generating the drive signal in response to the sensed parameter signal.

13. The data communication cable of claim 2, wherein the light driver circuit is configured to generate the drive signal to cause the one or more illumination fibers to emit light with a set of distinct characteristics based on a set of distinct events, respectively.

14. The data communication cable of claim 13, wherein the set of distinct characteristics includes at least two different hues for the emitted light.

15. The data communication cable of claim 13, wherein the set of distinct characteristics includes at least two different strobing patterns for the emitted light.

16. The data communication cable of claim 1, wherein the one or more illumination fibers extend longitudinally in a direction from the first connector towards the second connector.

17. The data communication cable of claim 16, further comprising a sleeve configured to at least partially enclose the one or more illumination fibers and the one or more communication mediums, wherein the sleeve is at least partially transparent or translucent.

18. The data communication cable of claim 1, wherein the one or more illumination fibers are situated within at least one of the first connector or the second connector, and wherein the at least one of the first connector or the second connector includes a housing that is at least partially transparent or translucent.

19. The data communication cable of claim 1, wherein the data signal is compliant with High-Definition Multimedia Interface (HDMI), DisplayPort, Digital Visual Interface (DVI), Universal Serial Bus (USB), or Quad Small Form-factor Pluggable (QSFP) standard.

20. The data communication cable of claim 1, wherein at least one of the first connector or the second connector includes a battery or a port for receiving a second power signal from a third device, wherein the one or more illumination fibers are configured to emit the light based on the second power signal.

21. The data communication cable of claim 1, wherein the one or more illumination fibers comprises a light diffusing fiber, light emitting diode (LED) wire, or an electroluminescent wire.

22. A data communication cable, comprising:
a first connector configured to connect to a first device;
a second connector configured to connect to a second device;
one or more communication mediums extending from the first connector to the second connector, wherein the one or more communication mediums are configured to route at least a data signal between the first and second devices;
one or more illumination fibers configured to emit light, wherein the one or more illumination fibers extend in a direction from the first device towards the second device, and wherein each of the one or more illumination fibers is not configured to route signal from the first device to the second device or vice-versa;
a light driver circuit situated within at least one of the first or second connector, wherein the light driver circuit is configured to generate a drive signal for causing the one or more illumination fibers to emit light; and
a sleeve configured to at least partially enclose the one or more communication mediums and the one or more illumination fibers, wherein the sleeve is at least partially transparent or translucent.

23. A data communication cable, comprising:
a first connector configured to connect to a first device;
a second connector configured to connect to a second device;
one or more communication mediums extending from the first connector to the second connector, wherein the one or more communication mediums are configured to route at least a data signal between the first and second devices;
one or more illumination fibers configured to emit light, wherein the one or more illumination fibers are situated within at least one of the first connector or the second connector and wherein each of the one or more illumination fibers is not configured to route signal from the first device to the second device or vice-versa; and
one or more light driver circuits situated within at least one of the first connector or the second connector, wherein the one or more light driver circuit are configured to generate a drive signal for causing the one or more illumination fibers to emit light through at least the first connector or the second connector.

* * * * *